(12) United States Patent
Chung

(10) Patent No.: US 6,558,289 B2
(45) Date of Patent: May 6, 2003

(54) HYBRID VEHICLE

(75) Inventor: Cheng-Ta Chung, Yunlin (TW)

(73) Assignee: National Science Council (TW)

( * ) Notice: Subject to any disclaimer, the term of this patent is extended or adjusted under 35 U.S.C. 154(b) by 0 days.

(21) Appl. No.: 09/789,287

(22) Filed: Feb. 20, 2001

(65) Prior Publication Data

US 2002/0061802 A1 May 23, 2002

(30) Foreign Application Priority Data

Oct. 13, 2000 (TW) ........................................ 89217798 U

(51) Int. Cl.$^7$ ................................................. B60K 1/02
(52) U.S. Cl. ........................................... 477/3; 180/65.2
(58) Field of Search ............................. 477/3; 475/2, 5; 180/65.6, 65.7

(56) References Cited

U.S. PATENT DOCUMENTS

| | | | | |
|---|---|---|---|---|
| 5,285,111 A | * | 2/1994 | Sherman | ................... 290/4 C |
| 5,558,175 A | * | 9/1996 | Sherman | ................... 180/65.2 |
| 5,577,973 A | * | 11/1996 | Schmidt | ................... 475/5 |
| 5,637,987 A | * | 6/1997 | Fattic et al. | ................... 322/40 |
| 5,713,425 A | * | 2/1998 | Buschhaus et al. | ........ 180/65.2 |
| 5,887,670 A | * | 3/1999 | Tabata et al. | ............. 180/65.2 |
| 5,931,757 A | * | 8/1999 | Schmidt | ................... 475/2 |

* cited by examiner

*Primary Examiner*—Dirk Wright
(74) *Attorney, Agent, or Firm*—Scott M. Oldham of Hahn Loeser + Parks, LLP

(57) ABSTRACT

A hybrid vehicle having an engine, a starter, a motor/generator, a driving shaft, a compound planetary-gear device and a vehicle control device is disclosed. The vehicle control device is used for powering the hybrid vehicle by the motor/generator alone when a vehicle speed detected by a vehicle speed detection device is below a predetermined switching vehicle speed, and for starting the engine by the starter as well as turning off the motor/generator when the vehicle speed reached the predetermined switching vehicle speed, and for modulating an output driving torque by controlling a torque and a speed of the motor/generator.

14 Claims, 16 Drawing Sheets

HYBRID VEHICLE

FIELD OF THE INVENTION

The present invention relates to a hybrid vehicle, and more specifically to a hybrid vehicle driven by an internal combustion engine, a single combined motor/generator and a compound planetary-gear transmission.

BACKGROUND OF THE INVENTION

Hybrid vehicle is one kind of vehicle that combines both internal- combustion engine and electrical motor as power source or driving unit. There are several types of hybrid vehicle that have been proposed. One of them is the series type of hybrid vehicle basically driven by electric motors with the electrical power generated from an internal-combustion engine. Another is the parallel type of hybrid vehicle driven by both an internal-combustion engine and an electric motor with the electrical power drawn from off-board electrical source, not from the internal- combustion engine. Furthermore, there are various compound types of hybrid vehicle whose characteristics are somewhat combined with those of the series and parallel type of hybrid vehicle. The major differences among the varieties of compound-type hybrid vehicle are related to their layout on power train and design on control strategy thereof.

In particular, one compound type of hybrid vehicle uses a driving motor, an internal-combustion engine and a generator connected through a differential gear. With this arrangement, the vehicle can be started from stop by the driving motor alone, and driven by both the driving motor and engine when it is driven beyond a specific vehicle speed. A portion of the driving power from the engine is generated into electric power for recharging an energy storage device or driving an electric motor. Additionally, the operating speed range of the engine can be controlled by the generator through the action of the differential gear. In consequence, the engine can be operated at a full load and a highly efficient range for better fuel economy and emission reduction.

However, since the engine and the generator are connected through a differential gear unit, the respective rotational speed and torque are mutually related. Therefore, in order to maintain fill throttle operation of the engine and fulfill various driving conditions, the generator is inevitably subjected to high generation load. This may cause high energy conversion loss and undesirable high charging load of the battery pack. Furthermore, the driving motor may be operated at high operating speed and low efficient range when the vehicle is cruising at a high speed range. The complexity of the compound-type hybrid vehicle including one electric motor and one generator, accompanied with a driver, also results in undesirable high manufacturing cost and more energy loss arising from additional weight and heat loss of power electronics.

Therefore, the present invention provides an improved hybrid vehicle for overcoming the problems described above.

SUMMARY OF THE INVENTION

It is, therefore, a primary object of the present invention to provide a hybrid vehicle which is capable of fulfilling vehicle staring and complex driving requirement by using one combined motor/generator, not separately one generator and one motor.

It is the second object of the present invention to provide a hybrid vehicle having an overdrive ratio for the motor/generator in the forward direction. The hybrid vehicle according to the present invention can prevent the motor/generator from operating at an undesirable high-speed and low-efficiency range when the vehicle is mainly driven by the engine.

It is the third object of the present invention to provide a hybrid vehicle which can reduce the generating load for the motor/generator as well as the charging load for the battery in the forward direction.

It is the fourth object of the present invention to provide a hybrid vehicle capable of switching among different operation modes by simply controlling the motor/generator and engine with or without operating the clutches.

It is the fifth object of the present invention to provide a hybrid vehicle capable of being smoothly started and driven at a low-speed range by the motor/generator alone and with the engine being off.

It is the sixth object of the present invention to provide a hybrid vehicle which can switch from a motor-driven mode to an engine-driven mode by simply turning the engine on and the motor/generator off with or without any clutch operation.

It is the seventh object of the present invention to provide a hybrid vehicle which can modulate the driving torque output from the engine to assist a required acceleration by controlling the torque output of the motor/generator in the forward direction.

It is the eighth object of the present invention to provide a hybrid vehicle which can distribute a portion of the driving power outputted from the engine to recharge the energy storage device, such as battery or ultracapacitor etc.

It is the ninth object of the present invention to provide a hybrid vehicle which can control the rotational speed of the engine through the differential action of the compound planetary-gear set by controlling the rotational speed of the motor/generator.

It is the tenth object of the present invention to provide a hybrid vehicle which can fulfill the required driving performance with a decreased throttle application and a narrowed operating speed range of the engine such that the maximum fuel economy and considerable emission reduction can be gained.

It is the eleventh object of the present invention to provide a hybrid vehicle which can turn off the engine during the period of decelerating, driving downhill and motor-driven mode at a low speed or stop, thereby reducing the unwanted fuel consumption and emission caused by the part-load operation of the engine.

It is the twelfth object of the present invention to provide a hybrid vehicle which can provide a large reduction ratio for the motor/generator in the reverse direction, thereby supplying sufficient drive torque for starting the vehicle at low speed mode.

It is the thirteenth object of the present invention to provide a hybrid vehicle which can be operated in various forward modes and one reverse mode with one compact and efficient planetary-gear set.

It is the fourteenth object of the present invention to provide a hybrid vehicle which can provide regenerative braking if the clutches are controllable.

According to the present invention, the hybrid vehicle includes an engine, a starter, a motor/generator, a driving shaft, a compound planetary-gear device and a vehicle control device. The starter is used for starting said engine. The motor/generator is operated in both generator mode and motor mode in a reverse direction as well as in a forward direction. The driving shaft is connected with driving wheels through reduction gears. The compound planetary-gear device is connected to the motor/generator, the engine and the driving wheels through the driving shaft and the reduction gears. The vehicle control device is used for powering the hybrid vehicle by the motor/generator alone when a vehicle speed detected by a vehicle speed detection device is below a predetermined switching vehicle speed, and for starting the engine by the starter as well as turning off the motor/generator when the vehicle speed reached the predetermined switching vehicle speed, and for modulating an output driving torque by controlling a torque and a speed of the motor/generator.

Preferably, the compound planetary-gear device includes a first planetary-gear set and a second planetary gear set. The first planetary gear set includes a first sun gear, a first annulus gear and a plurality of first planetary gears mounted on a first carrier, and the second planetary- gear set is interconnected to the first planetary-gear set. The second planetary-gear set includes a second sun gear, a second annulus gear and a plurality of second planetary gears mounted on a second carrier. The first sun gear is fixed to ground, the first carrier is interconnected with the second sun gear and said motor/generator, and the second carrier is connected to the engine.

Preferably, the hybrid vehicle further includes a dual-drive clutch, a dual-drive shaft and a locking clutch. The dual-drive clutch is selectively used to engage or disengage the connection between the first annulus gear and the second annulus gear. The dual-drive shaft is connected with the first annulus gear device and the driving shaft through the dual-drive clutch. The second annulus gear is selectively connected to the dual-drive shaft and the first annulus gear device through the dual-drive clutch and is connected to the driving shaft. The locking clutch is selectively used to lock a shaft connected between the second carrier and the engine to ground.

In accordance with an aspect of the present invention, when the motor/generator drives the driving wheels in reverse direction and the engine is off, the locking clutch is locked to ground.

In accordance with another aspect of the present invention, when the engine is started by the starter to serve as a main driving source of the hybrid vehicle, the motor/generator is off and the vehicle speed reaches the predetermined switching vehicle speed, the locking clutch is unlocked.

In accordance with another aspect of the present invention, when the motor/generator is at a driving mode in forward direction and both the motor/generator and the engine can drive the hybrid vehicle through both the dual-drive shaft and the driving shaft, the dual-drive clutch is locked.

In accordance with another aspect of the present invention, when the motor/generator is at a generator mode in forward direction and a generator load thereof is insufficient to release the dual-drive clutch from a locking condition, the dual-drive clutch is locked.

In accordance with another aspect of the present invention, when the motor/generator is at a generator mode in forward direction and serves to generate electric power to recharge an energy storage device, the rotational speed of the engine is controlled by adjusting the rotational speed of the motor/generator through a differential action of the second planetary-gear set, and the hybrid vehicle is solely driven by the engine through the driving shaft, the dual-drive clutch is unlocked.

The vehicle according to the present invention is smoothly started by the motor/generator with driving torque output in reverse direction. When vehicle speed reaches an engine starting speed, the engine is started by a starter. As the engine is ignited, the vehicle is mainly driven by the engine. The motor/generator serves to modulate the output torque from the engine in response to the acceleration or deceleration of the vehicle. In this way, it is possible to effect the desired acceleration with decreased throttle application in order to provide maximum economy of operation and to achieve the desired emission reduction.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENTS

Figure 1:
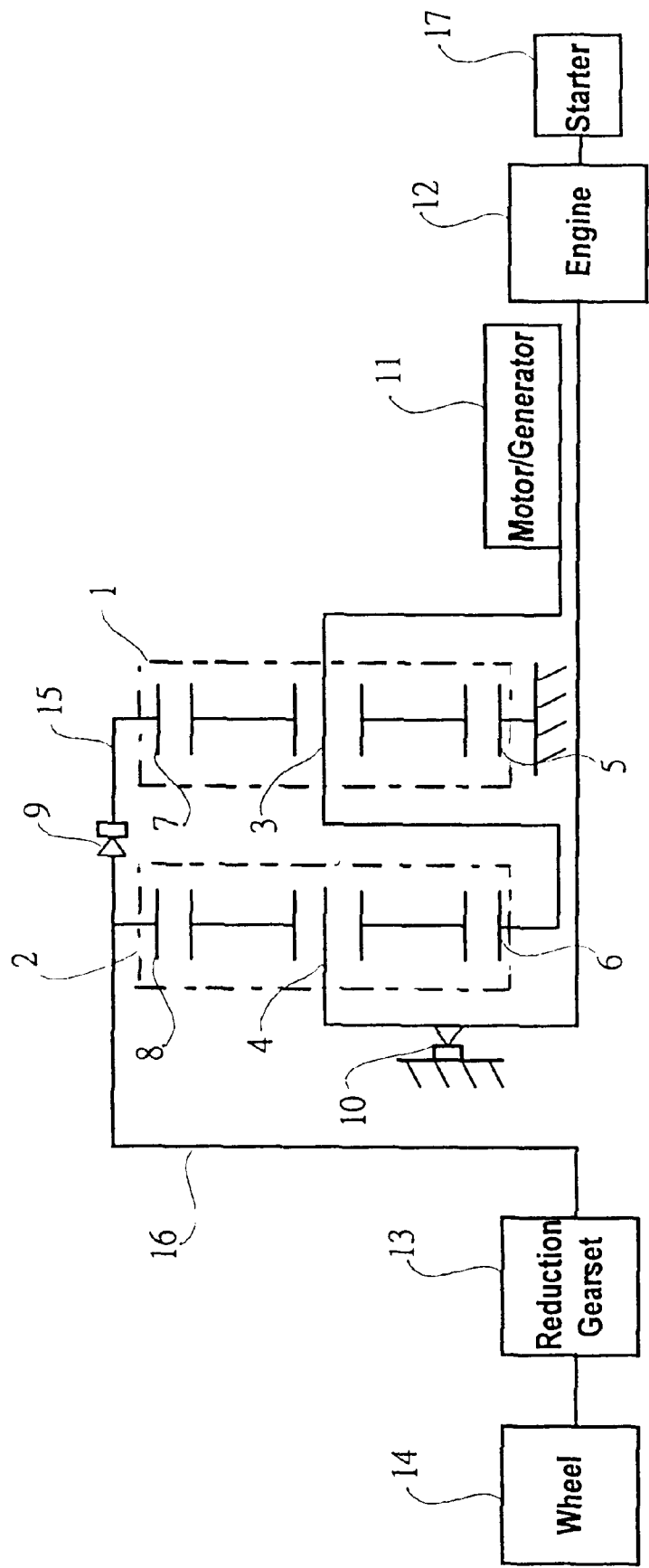
FIG. 1 is a schematic view illustrating a power train in a hybrid vehicle according to the first preferred embodiment of the present invention.

FIG. 1 shows the schematic view of a power train in a hybrid vehicle according to the first embodiment of the present invention. The first planetary-gear set 1 is interconnected with the second planetary-gear set 2, wherein each set includes a sun gear device, an annulus gear device, and a plurality of planetary pinions. The planetary pinions 20,21 are mounted on the first carrier 3 and the second carriers 4 to connect the annulus gear device and the sun gear device of the first gear set 1 and the second gear set 2 respectively. The first sun gear device 5 is permanently fixed to ground. The first planetary carrier 3 is interconnected to the second sun gear 6 and also connected to the motor/generator 11. The second planetary carrier 4 is connected to the engine 12. The dual-drive one-way clutch 9 is selectively to engage or disengage the connection between the first annulus gear 7 and the second annulus gear 8. The dual-drive shaft 15 is connected with the first annulus gear 7 and the driving shaft 16 through the dual-drive one-way clutch 9. The second annulus gear 8 is selectively connected with the dual-drive shaft 15 and the first annulus gear 7 through the dual-drive one-way clutch 9 and connected to the driving shaft 16. The locking one-way clutch 10 is selectively to lock the shaft connected with the second planetary carrier 3 and the engine 12 to ground.

With the layout of the power train described above, the hybrid vehicle can be operated at different operation modes in response to various driving conditions.

Figure 2:
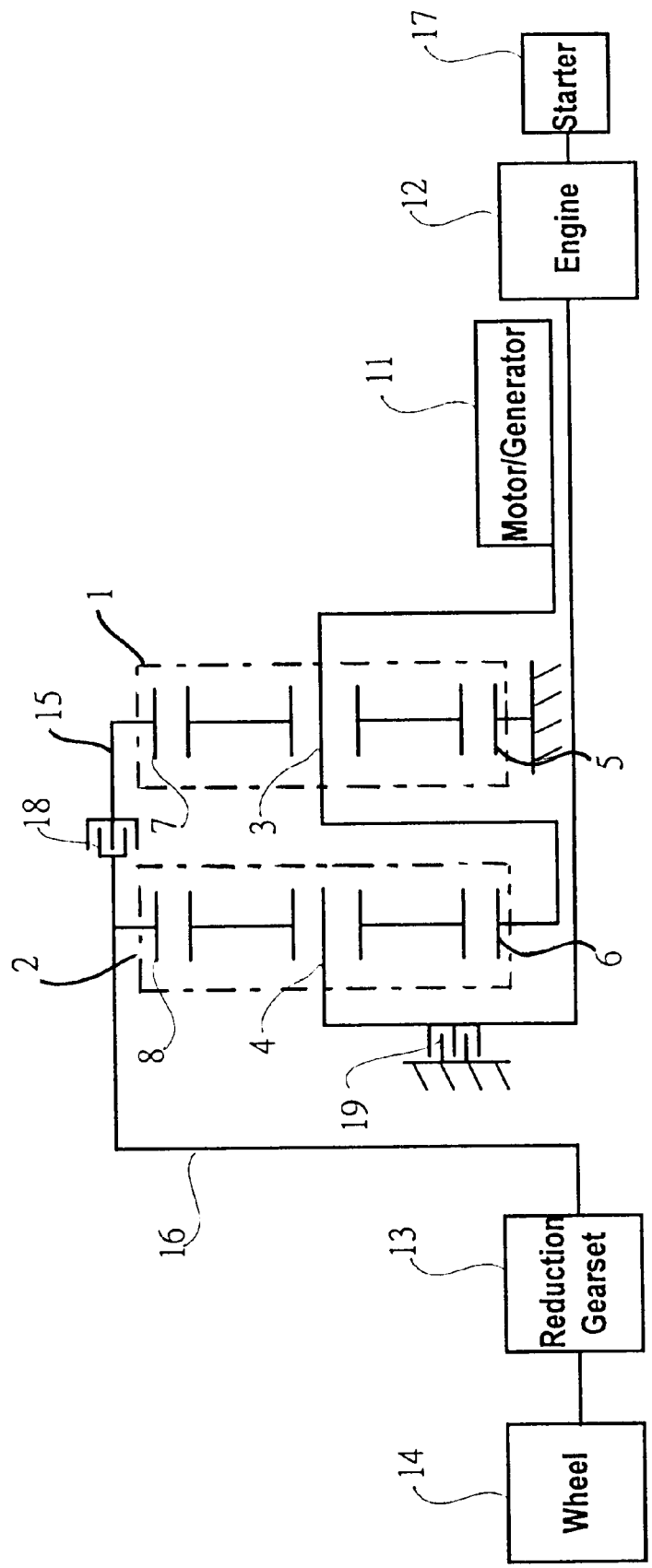
FIG. 2 is a schematic view illustrating a power train in a hybrid vehicle according to the second preferred embodiment of the present invention.

FIG. 2 shows the schematic view of a power train according to the second embodiment of the present invention. The same reference numerals used in FIG. 1 designate the same components of the first embodiment such that the description thereof will be omitted. The major differences of the second embodiment from the first one will be described below. In the second embodiment, a dual-drive controllable clutch 18 is installed between the driving shaft 16 and the dual-drive shaft 15 in place of the dual-drive one-way clutch 9. The other locking controllable clutch 19 is installed in place of the locking one-way clutch 10 for selectively locking the shaft connected with the second planetary carrier 3 and the engine 12 to ground.

Figure 3:
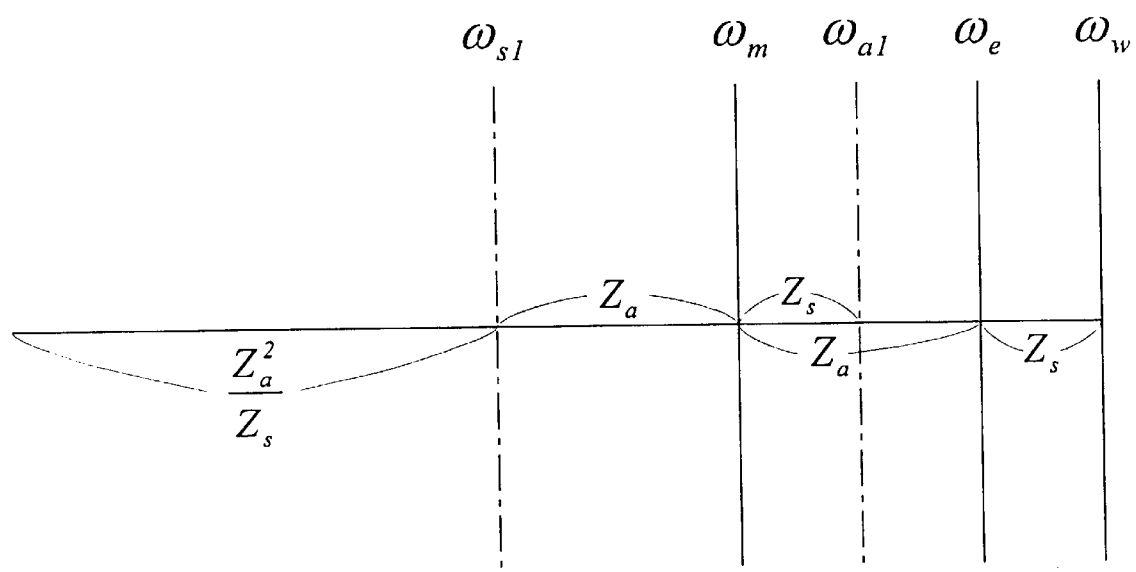
FIG. 3 is a rotational-speed line diagram of a power train in a hybrid vehicle for the first and second preferred embodiments of the present invention.

FIG. 3 shows the conceptual line diagram for depicting the relations of the rotational speeds among the elements in the compound planetary-gear sets and the connected units for the first and second embodiments. In the present embodiments, the numbers of teeth for the first gear set 1 and the second gear set 2 are identical. The numbers of teeth for the annulus gear, the planetary carrier, and the sun gear are defined as Za, Zp, and Zs respectively. The rotational speed is defined as $\omega$ and the capitals 'e', 'w', 'm', '1' and '2' are referred to the engine 12, the driving shaft 16, the motor/generator 11, the first gear set 1, and the second gear set 2, respectively. Referring to the arrangements in FIG. 1 and FIG. 2, the relations can be stated as follows:

$$\omega_e = \omega_{p2},$$

$$\omega_m = \omega_{p1} = \omega_{s2}, \text{ and}$$

$$\omega_w = \omega_{a2}$$

Now, with the length of the segments on the horizontal line are drawn according to the ratio indicated in FIG. 3, this conceptual line diagram can be used to illustrate the relation of the rotational speeds hereinafter.

According to these two embodiments, various operating modes of the hybrid vehicle will be described below.

Low Speed Mode

As the vehicle starts from stop and drives at a speed below a predetermined switching speed for starting an engine, the motor/generator 11 acts as a motor and generates a driving torque and the engine 12 is off.

Figure 4:
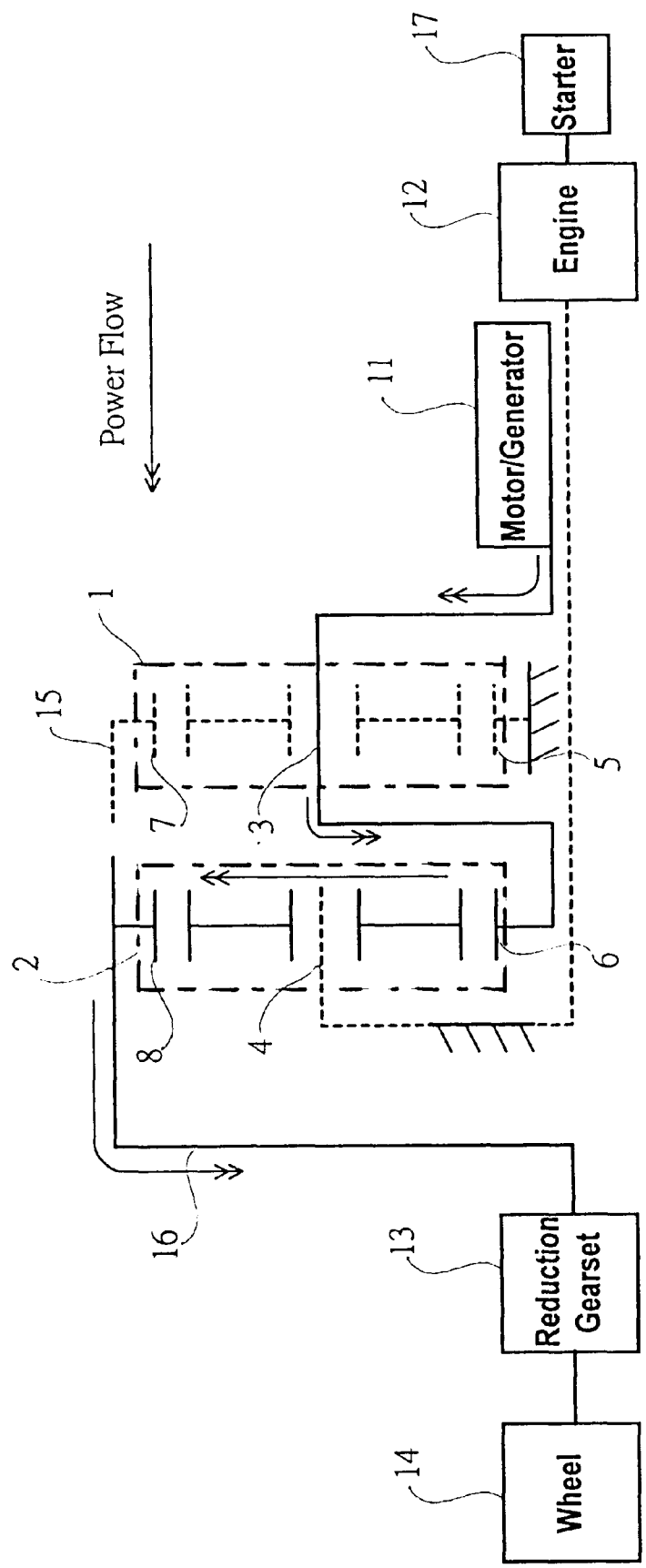
FIG. 4 is a schematic diagram indicating the power flow in the Low Speed Mode for the first and second preferred embodiments of the present invention, and also the power flow in the Reverse Mode according to the second preferred embodiment of the present invention, wherein the elements shown in dotted lines are either in free-wheeling or stationary condition without any power flowing therethrough.
Figure 5:
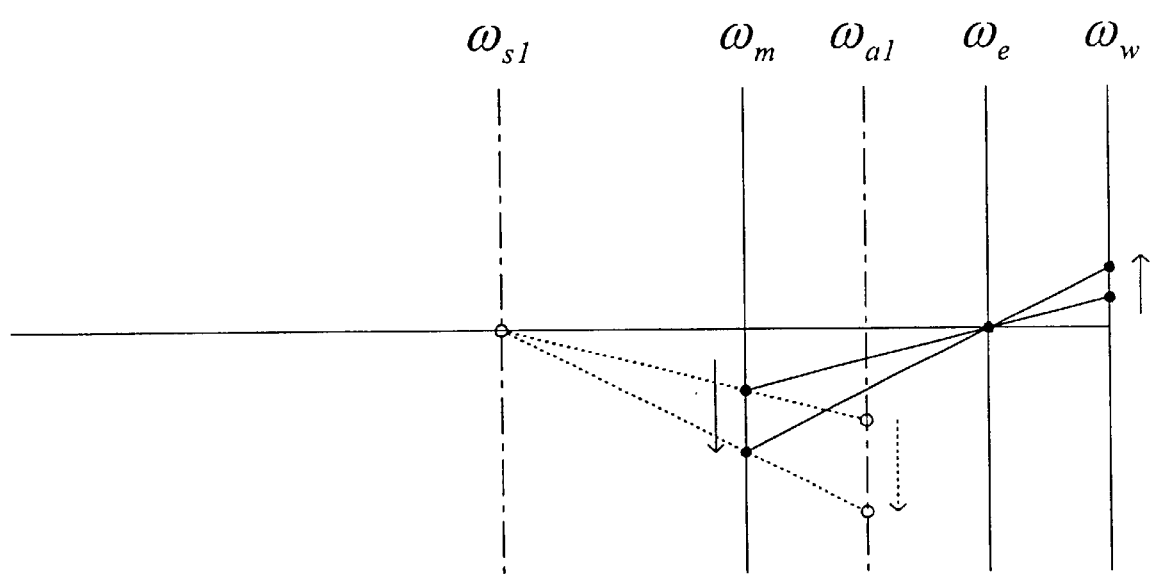
FIG. 5 is a rotational-speed line diagram of a hybrid vehicle in the Low Speed Mode for the first and second preferred embodiments of the present invention.

FIG. 4 shows the power flow in a Low Speed Mode for the first embodiment of the present invention. The elements shown in dotted lines are either in a free-wheeling or a stationary condition without any power flowing therethrough. FIG. 5 shows the rotational-speed line diagram of a hybrid vehicle in a Low Speed Mode for the first and second embodiments of the present invention. Referring to FIG. 4 and FIG. 5, the motor/generator 11 rotates in the reverse direction and drives the driving wheels through the second planetary-gear set 2. The reaction torque from the second planetary carrier 4 forces the locking one-way clutch 10 to ground so that the rotational speed of the engine 12 is zero (i.e. $\omega_e = 0$). With the one-way clutch 10 being grounded, the differential action of the second planetary-gear set 2 is ceased in the mean time. That is to say, the rotational speed of driving shaft 16 can be solely determined by the rotational speed of the motor/generator 11. The relation of rotational speeds and torques, defined as T, between the motor/generator 11 and the driving shaft 16 are shown as follows:

$$\omega_e : \omega_w = Z_s : Z_a, \text{ and}$$

$$T_W : T_m = Z_a : Z_s.$$

Since $Z_a$ is greater than $Z_s$, the torque of the motor/generator 11 can be enhanced to launch the vehicle from stop. The dual-drive one-way clutch 9 is disengaged because the first annulus gear 7 is rotated in the reverse direction and the second annulus gear 8 is rotated in the forward direction.

FIG. 4 also shows the power flow in the Low Speed Mode for the second embodiment of the present invention. The operating characteristics of the first embodiment are similar to those of the first embodiment described above except that the locking clutch 19 is engaged and the dual-drive clutch 18 is disengaged by some controllable devices.

Low/High Switching Mode

Figure 6:
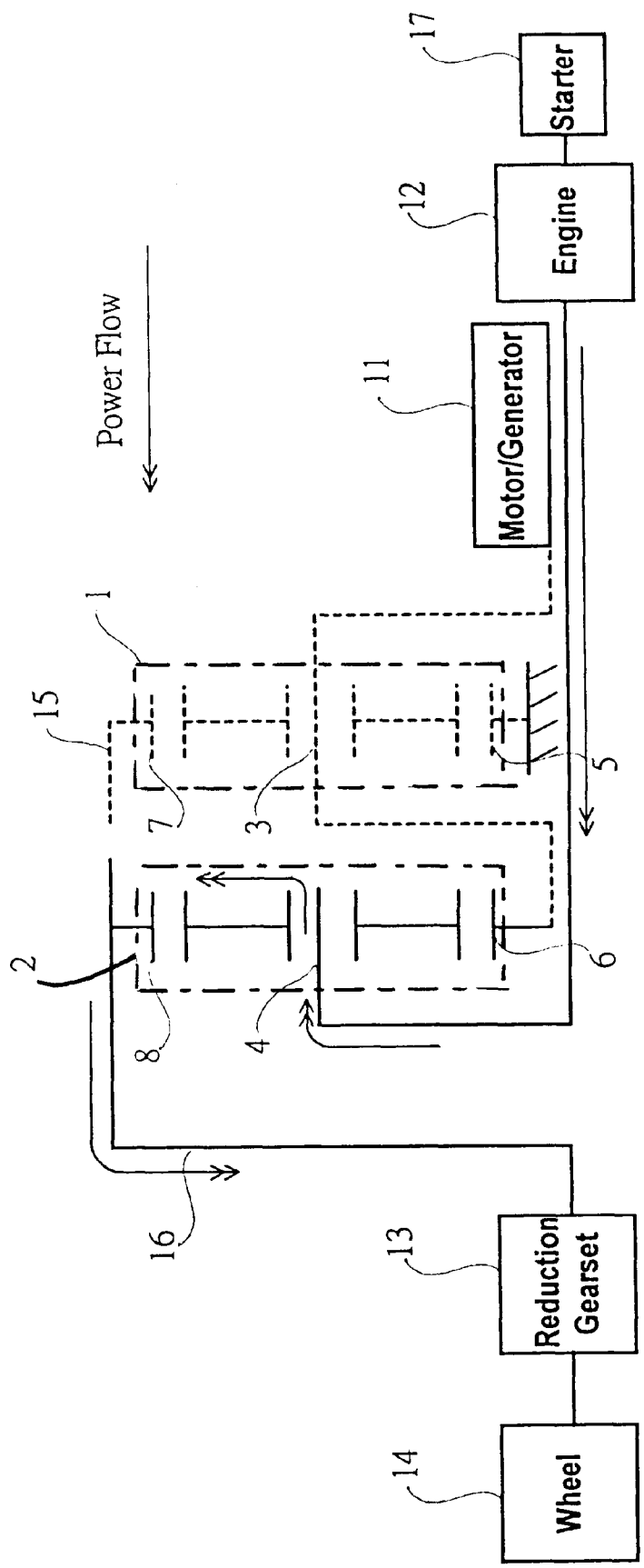
FIG. 6 is a schematic diagram indicating the power flow in the first stage of the Low/High Switching Mode for the first and second preferred embodiments of the present invention, wherein the elements shown in dotted lines are either in free-wheeling or stationary condition without any power flowing therethrough.
Figure 7:
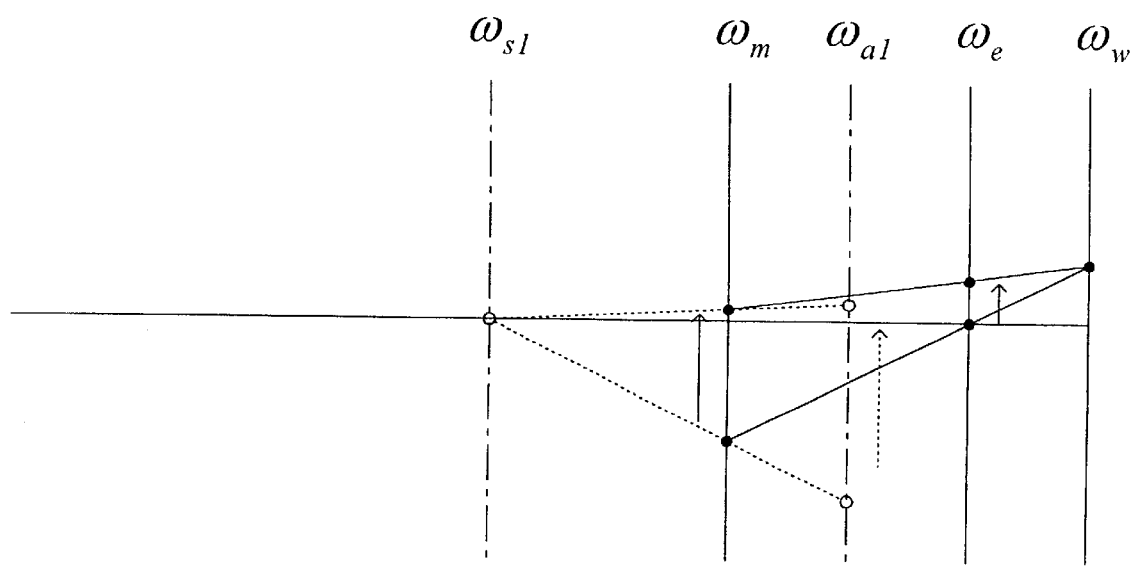
FIG. 7 is a rotational-speed line diagram of a hybrid vehicle in the first stage of the Low/High Switching Mode for the first and second preferred embodiments of the present invention.

As the vehicle has reached a predetermined switching speed for switching the operation from a low speed mode to a high speed mode, the motor/generator 11 is temporarily turned off or decreases its torque output. In the mean time, the engine 12 begins to rotate with the aid of an engine starter. FIG. 6 depicts the power flow in the first stage of the Low/High Switching Mode for the first embodiment of the present invention. FIG. 7 shows the rotational-speed line diagram in the fist stage of the Low/High Switching Speed Mode according to the first and second embodiments of the present invention. The engine starter 17 is used to facilitate building up the engine speed and also produces a compensatory torque for maintaining the required traction of the vehicle. Meanwhile, the motor/generator 11 is off so that the reaction torque from the first planetary carrier 3 is diminished and the locking one-way clutch 10 is released from grounding condition. The rotational speed of the motor/generator 11 is decreased as the engine speed is increased. Subsequently, the motor/generator 11 will change its rotation direction from the reverse direction to the forward direction, as shown in FIG. 7.

Figure 8:
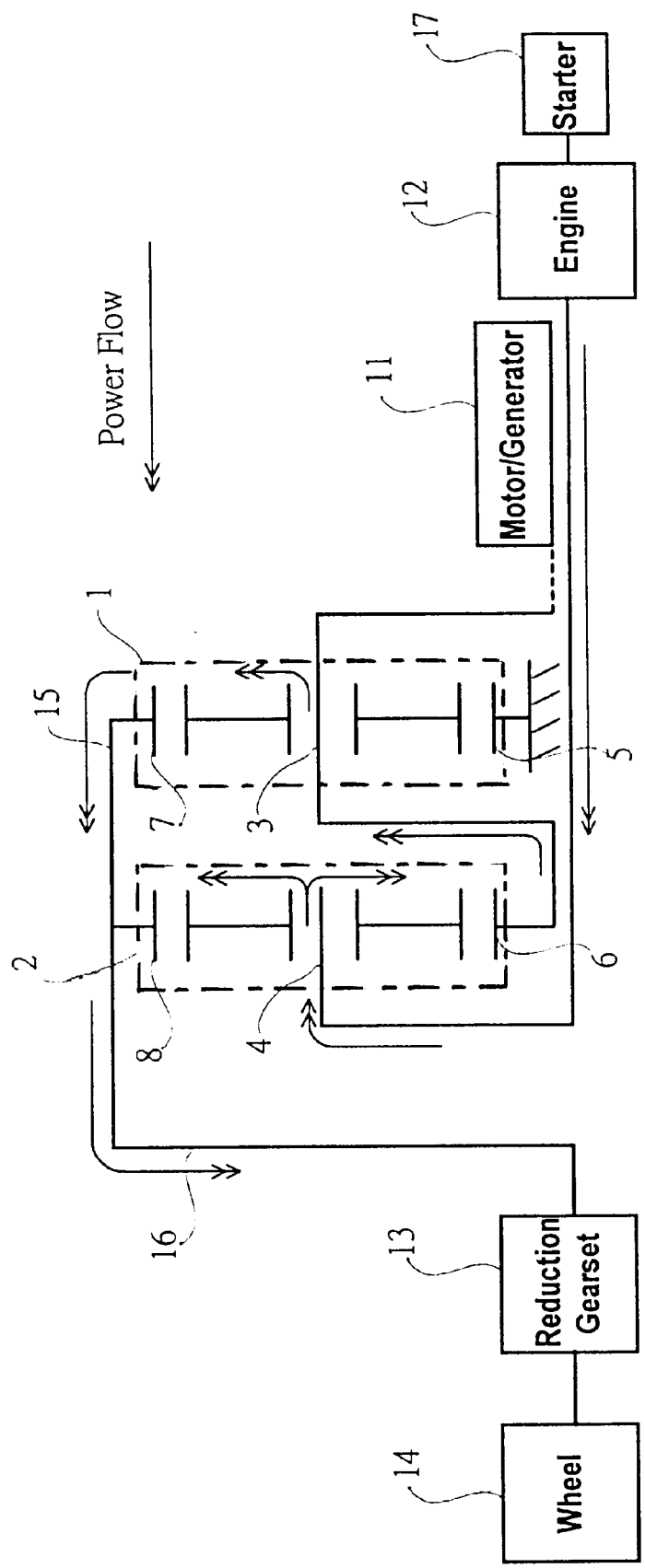
FIG. 8 is a schematic diagram indicating the power flow in the second stage of the Low/High Switching Mode for the first and second preferred embodiments of the present invention, wherein the elements shown in dotted lines are either in free-wheeling or stationary condition without any power flowing therethrough.
Figure 9:
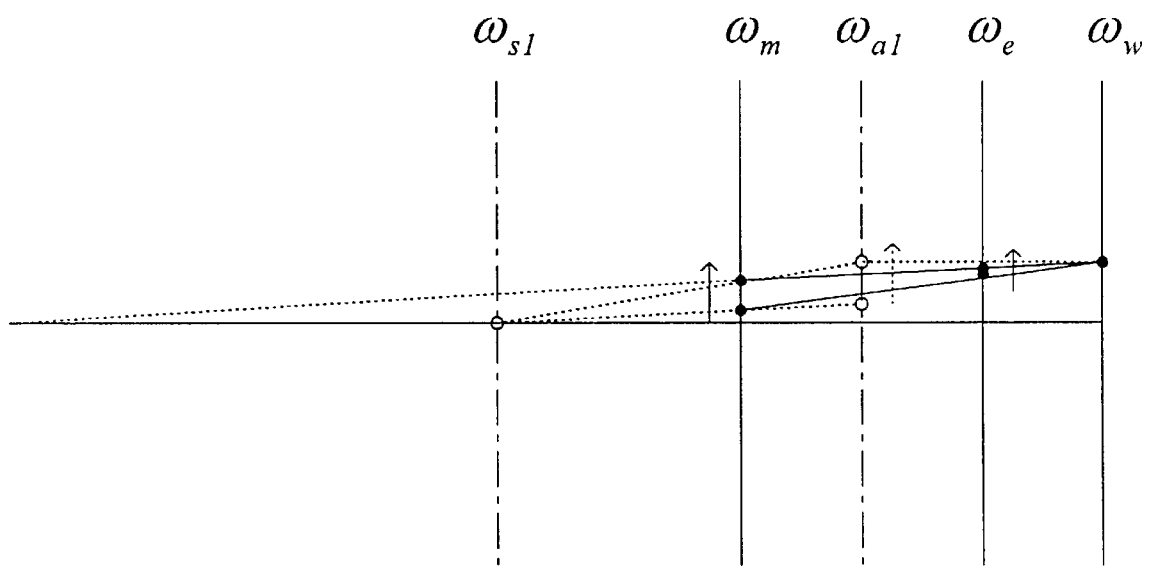
FIG. 9 is a rotational-speed line diagram of a hybrid vehicle in the second stage of the Low/High Switching Mode for the first and second preferred embodiments of the present invention.

FIG. 8 illustrates the power flow in the second stage of the Low/High Switching Mode according to the first embodiment of the present invention. As the engine speed is increased up to one specific speed, the engine is ignited and starts to drive the vehicle. At the same time, the rotational speed of the motor/generator 11 keeps increasing in the forward direction and the rotational speed of the first annulus gear 8 increases accordingly, because the first sun gear is permanently held stationary, as can be seen in FIG. 9. As the rotational speed of the first annulus gear 7 reaches that of the second annulus gear 8, the driving shaft 16 and the dual-drive shaft 15 are connected through the engaging action of the dual-drive one-way clutch 9. Hence, the driving power from the engine 12 is transmitted through both the first planetary-gear set 1 and the second planetary-gear set 2 as shown in FIG. 8.

FIGS. 8 and 9 also illustrate the power flow and the rotational-speed line diagram of a hybrid vehicle in the first and second stages of the Low/High Switching Mode for the second embodiment of the present invention. The operating characteristics of the second embodiment are similar to those of the first embodiment described above except that the engaging or disengaging actions of the locking clutch 19 and the dual-drive clutch 18 are operated by some controllable devices.

High Speed Modulating Mode

Right after the operation in the Low/High Switching Mode, the engine 12 has been ignited and the motor/generator 11 is still off. Hence, the driving torque of the engine 12 causes the first planetary carrier 3 and the first annulus gear 7 to have a tendency to increase the rotational speed in the forward direction, which also keeps the dual-drive one-way clutch 9 remain engaged. Subsequently, the operation changes into a High Speed Modulating Mode.

Figure 10:
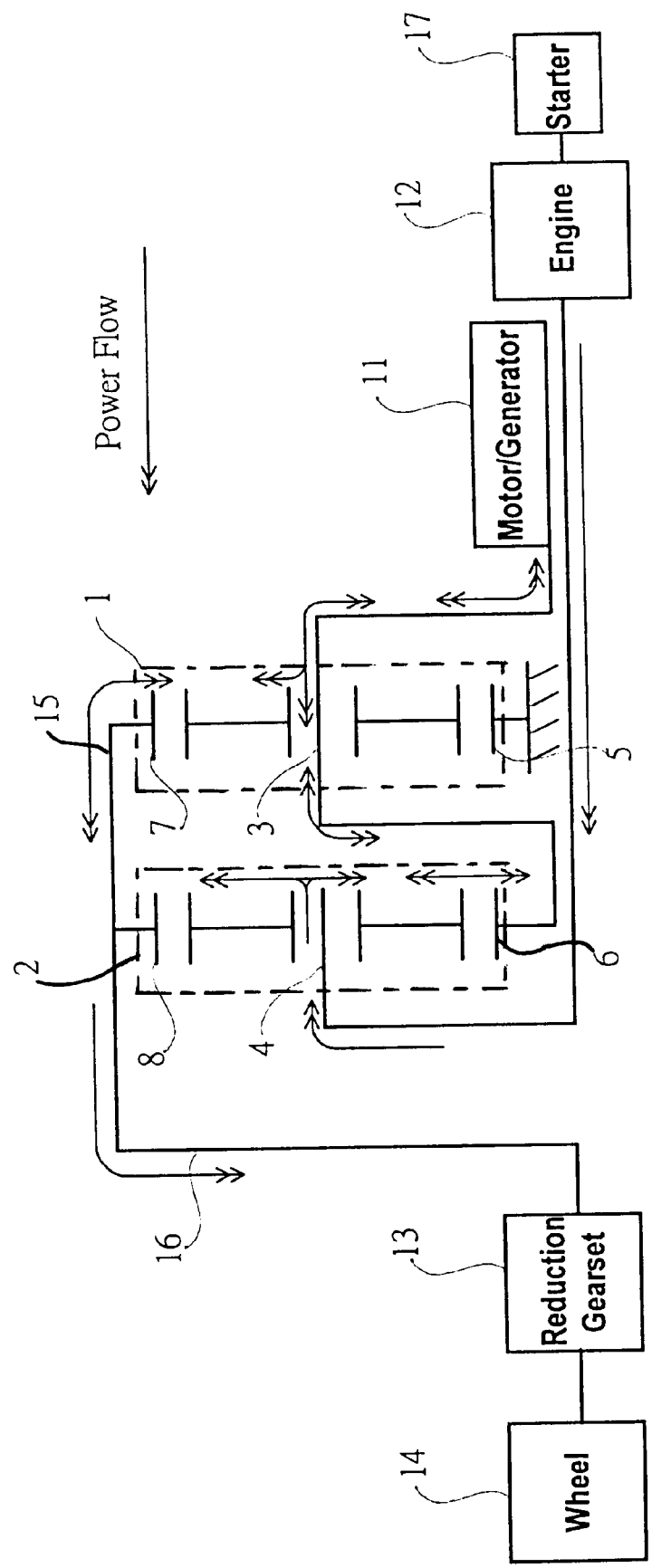
FIG. 10 is a schematic diagram indicating the power flow in the High Speed Modulating Mode for the first and second preferred embodiments of the present invention, wherein the elements shown in dotted lines are either in free-wheeling or stationary condition without any power flowing therethrough.
Figure 11:
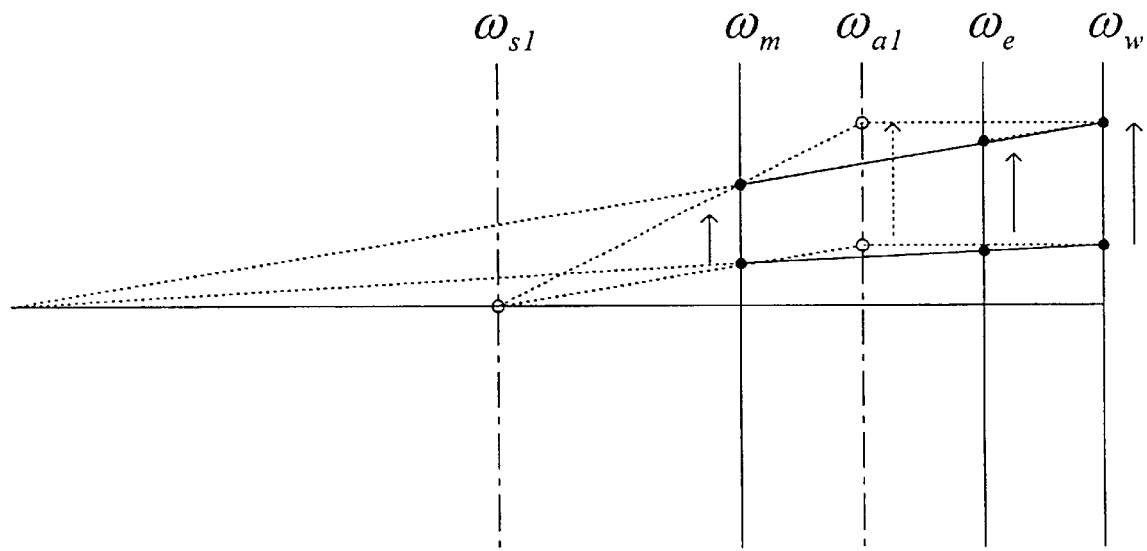
FIG. 11 is a rotational-speed line diagram of a hybrid in the High Speed Modulating Mode for the first and second preferred embodiments of the present invention.

FIG. 10 shows the power flow in the High Speed Modulating Mode for the first embodiment. FIG. 11 shows the rotational-speed line diagram in the High Speed Modulating Mode for the first and second embodiments of the present invention. In this mode, the motor/generator 11 is turned on either in a motor mode or a generator mode. The dual-drive one-way clutch maintains engaged so that $\omega_e$ is equal to $\omega_{a1}$, as shown in FIG. 11. The relations of the torques and rotational speeds between the engine 12 and the driving shaft 16 are $$\omega_w : \omega_e = T_e : T_w = (Z_a + Z_s)^2 : (2Z_a Z_s + Z_a^2).$$

The relations of the torques and rotational speeds between the motor/generator 11 and the driving shaft 16 are $$\omega_w : \omega_m = T_m : T_w = (Z_a + Z_s) : Z_a.$$

Hence, in this mode, both the engine 12 and the motor/generator 11 can drive independently the vehicle through the driving shaft 16 with the relation shown below.

$$T_w = \frac{2Z_a Z_s + Z_a^2}{(Z_a + Z_s)^2} T_e + \frac{Z_a}{Z_a + Z_s} T_m$$

Furthermore, the rotational speeds of the engine 12 and the motor/generator 11 can be kept below that of the driving shaft 16, as shown in FIG. 11. As a result, the engine 12 and the motor/generator 11 can be operated at an optimal low-speed range when the speed of the vehicle increases towards high top end.

In order to minimize the throttle operation of the engine 12 for improving fuel economy and emission reduction, the engine 12 is intended to maintain fairly constant torque output at a rotational speed. The motor/generator 11 serves to modulate the torque output from the engine 12 in response to various driving conditions and states of energy storage. For instance, the throttle position of the engine 12 can be set to one specified position according to different states of energy storage, and the motor/generator 11 adjusts the torque output in accordance with the position of accelerator pedal.

FIG. 10 and FIG. 11 also show the power flows and the rotational-speed line diagram in the High Speed Modulating Mode for the second embodiment of the present invention. The operating characteristics of the second embodiment are similar to those of the first embodiment described above except that the engaging or disengaging actions of the locking clutch 19 and the dual-drive clutch 18 are operated by some controllable devices.

High Speed Recharging Mode

Figure 12:
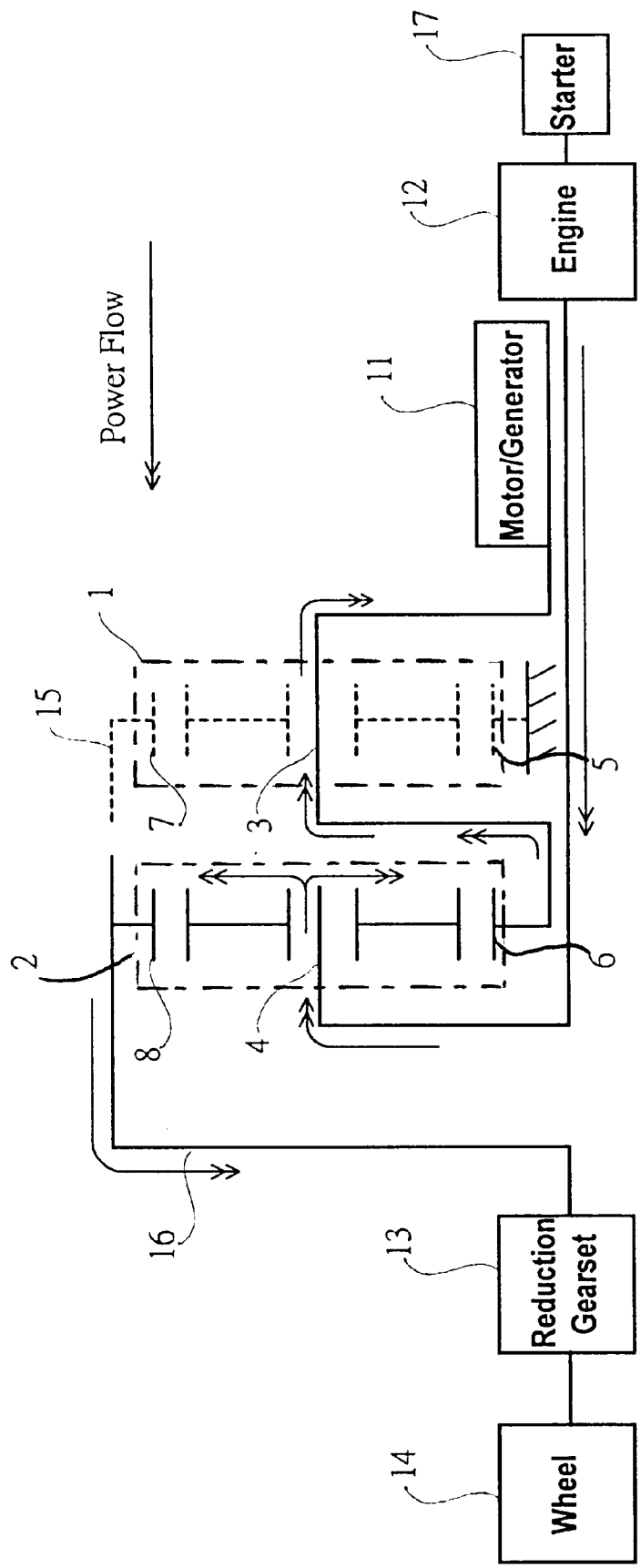
FIG. 12 is a schematic diagram indicating the power flow in the High Speed Recharging Mode for the first and second preferred embodiments of the present invention, wherein the elements shown in dotted lines are either in free-wheeling or stationary condition without any power flowing therethrough.

As the motor/generator 11 changes from motor mode to generator mode in High Speed Modulating Mode for the first embodiment, the reaction torque produced by the motor/generator 11 tends to release the dual-drive one-way clutch 9 from engaging. This reaction torque is opposed to the driving torque distributed from the engine 12 by way of the second planetary carrier 4, the second sun gear 6 and the first planetary carrier 3. If the reaction torque is larger than the driving torque, that is $$|T_m| > \frac{Z_s}{Z_a + Z_s} T_e,$$

the dual-drive one-way clutch 9 is disengaged so as to disconnect the first annulus gear 7 and the second annulus gear 8. Then, the first planetary-gear set 1 is free-wheeling and the second planetary-gear set 2 acts as a differential gear. The driving power from the engine 12 flows only through the second planetary-gear set 2 as shown in FIG. 12. At that time, the vehicle is now operated in a High Speed Recharging Mode. The relations of the torques and rotational speed are shown as follows:

$$\omega_m + \frac{Z_a}{Z_s} \omega_w = \frac{Z_a + Z_s}{Z_s} \omega_e$$

$$T_e : T_m : T_w = Z_a + Z_s : -Z_s : -Z_a$$

In this mode, the second planetary-gear set 2 distributes a portion of the engine power through the second annulus gear 8 to the driving shaft 16, and the other portion of that through the second sun gear 6 to the motor/generator 11.

The motor/generator 11 serves to generate electrical power to recharge energy storage device. Furthermore, the rotational speed of the engine 12 can be regulated according to a specific vehicle speed by controlling the rotational speed of the motor/generator 11 so as to provide optimal efficiency, as shown in FIG. 13.

Figure 13:
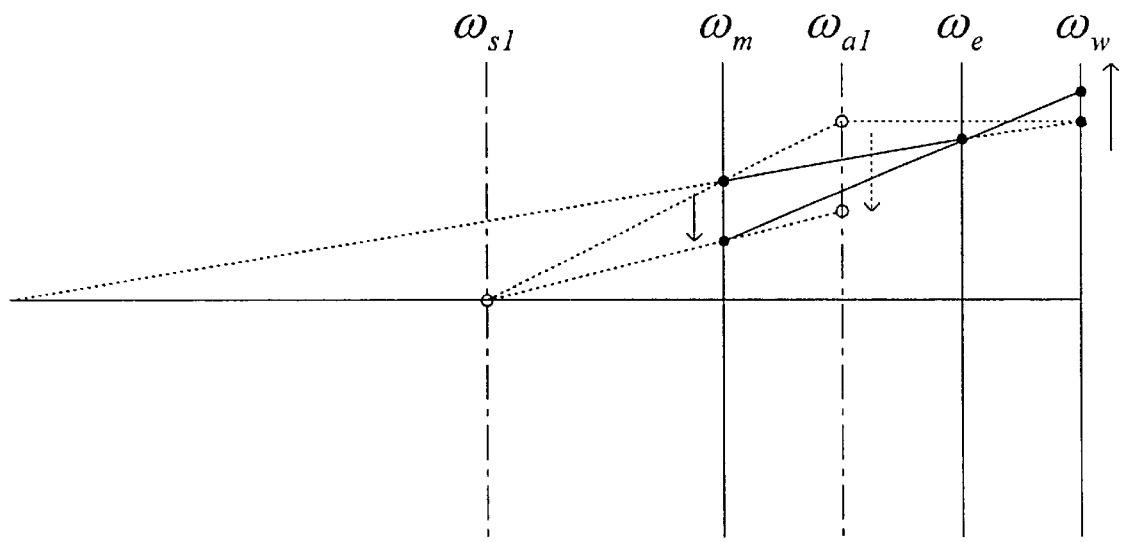
FIG. 13 is a rotational-speed line diagram in the High Speed Recharging Mode for the first and second preferred embodiments of the present invention.

FIG. 12 and FIG. 13 also show the power flows and the rotational-speed line diagram in the High Speed Recharging Mode for the second embodiment of the present invention. The operating characteristics of the first embodiment are similar to those of the first embodiment described above except that the engaging or disengaging actions of the locking clutch 19 and the dual-drive clutch 18 are operated by some controllable devices.

Decelerating Mode

If the vehicle for the first embodiment is required to perform decelerating by driving in a Low Speed Mode, this is done by simply reducing driving torque of the motor/generator 11 or applying brake on the wheel.

Figure 14:
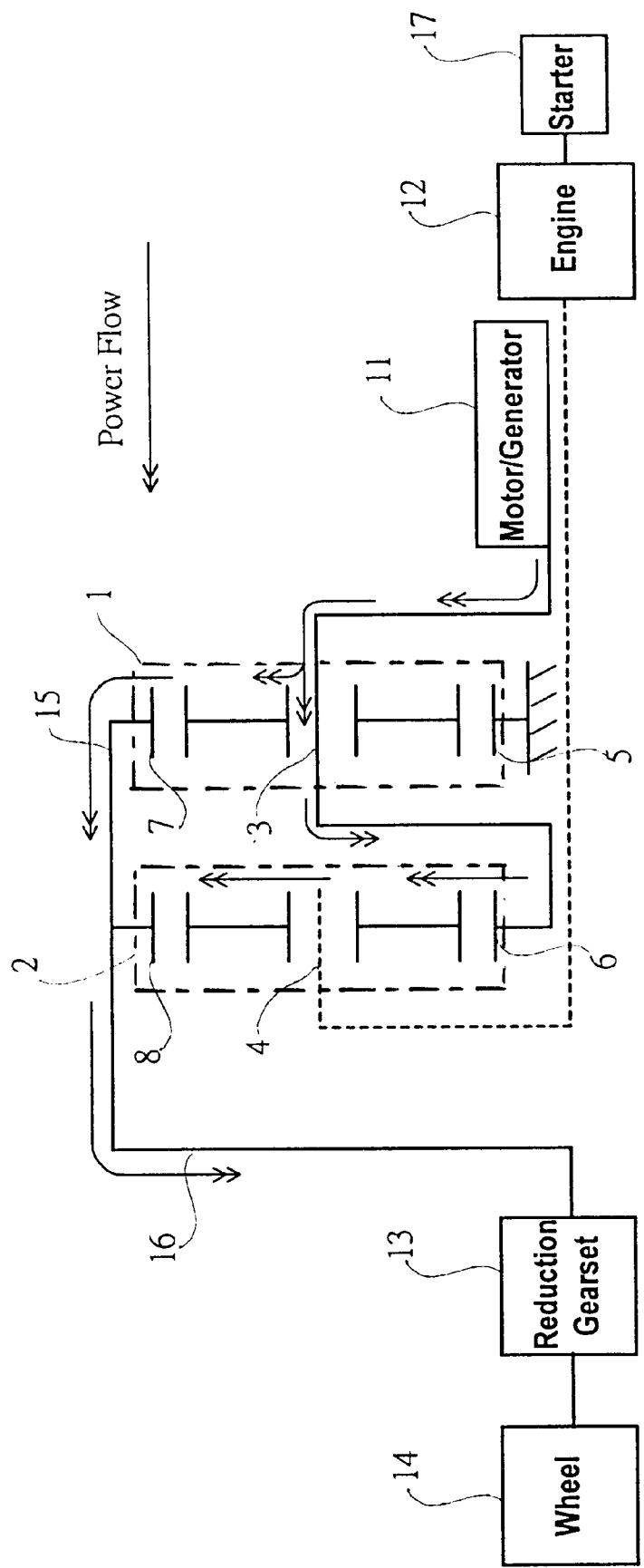
FIG. 14 is a schematic diagram indicating the power flow in the Decelerating Mode for the first and second preferred embodiments of the present invention, wherein the elements shown in dotted lines are either in free-wheeling or stationary condition without any power flowing therethrough.
Figure 15:
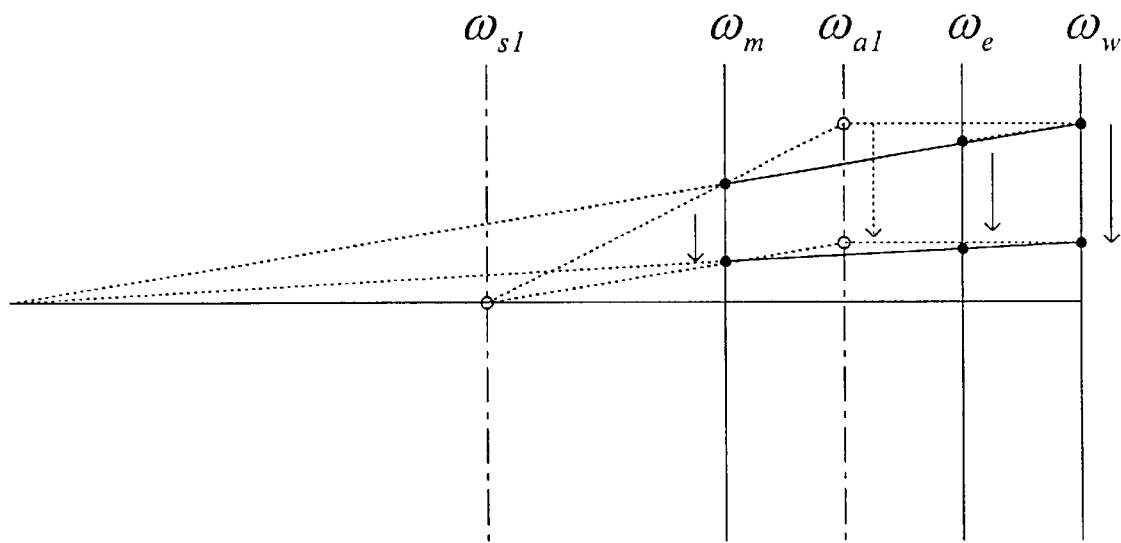
FIG. 15 is a rotational-speed line diagram in the Decelerating Mode in accordance with the first and second preferred embodiments of the present invention.
Figure 16:
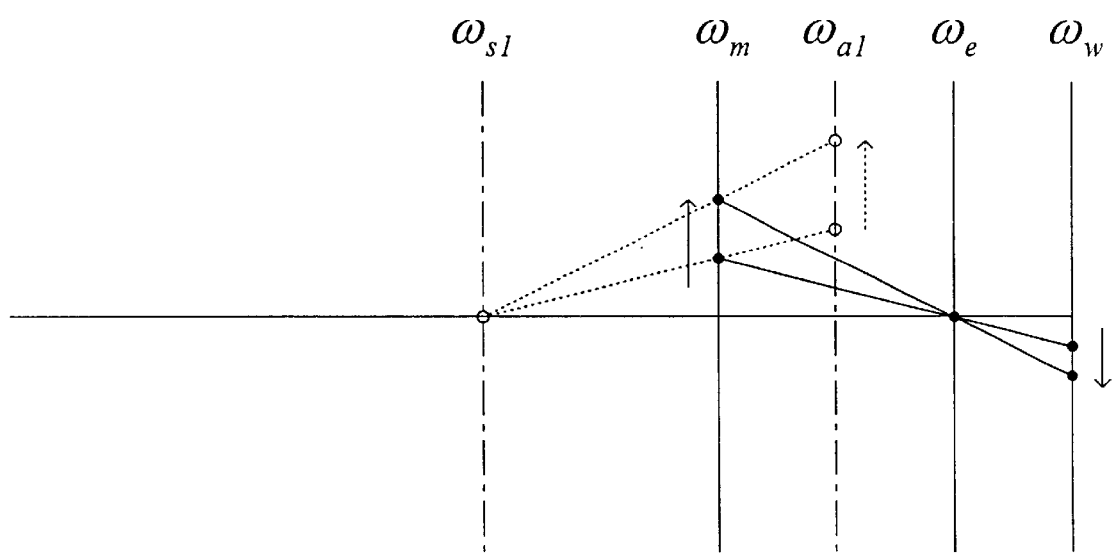
FIG. 16 is a rotational-speed line diagram in the Reverse Mode in accordance with the first and second preferred embodiments of the present invention.

If the vehicle for the first embodiment is required to perform decelerating by driving in a High Speed Modulating Mode, this is achieved by reducing the modulating torque of the motor/generator 11, turning off the engine 12, and applying brake on the wheel in sequence. During this operation, the motor/generator 11 keeps providing a small amount of driving torque or simply turns off, as shown in FIG. 14 and FIG. 15 such that the dual-drive one-way clutch can remain engaged. The purpose for this operation is that the rotational speed of the engine 12 can be kept as high as possible for restarting the engine 12 at any moment.

If the vehicle for the first embodiment is required to perform decelerating by driving in a High Speed Recharging Mode, this is initially achieved by reducing both the reaction torque of the motor/generator 11 and the driving torque of the engine 12 simultaneously. The purpose for this operation is to make the dual-drive one-way clutch return to engaging condition. If more decelerating is required at this moment, this can be achieved by turning off the engine 12 and applying brake on the wheel in sequence. During this operation, the dual-drive one-way clutch remains engaged so that the rotational speed of the engine 12 can be kept as high as possible for restarting the engine 12 at any moment.

The operating characteristics of the second embodiment in Decelerating Mode are similar to that of the first embodiment, as shown in FIG. 14 and FIG. 15. There are two major differences between them. One is that it is no more necessary for the second embodiment to provide a driving torque from the motor/generator 11. The other is that the second embodiment can perform regenerative braking to assist mechanical braking by switching the motor/generator 11 to a generator mode.

Reverse Mode

Unlike the first embodiment having two one-way clutches, the clutches installed in the second embodiment are controllable, thereby offering the second embodiment a possibility of driving the vehicle in the reverse direction without additional gear sets. The operation of this mode is similar to that of the Low Speed Mode as shown in FIG. 3, except that the motor/generator 11 rotates in the forward direction and drives the driving wheel through the second planetary-gear set 2, as shown in FIG. 18.

From the forgoing description, it is readily apparent that these two embodiments for hybrid vehicles provide an efficient power train to fulfill various driving conditions. The first embodiment is especially suitable for motorcycles, because the construction with two one-way clutches makes the operation rather simple. The second embodiment is more applicable to a four-wheel automotive vehicle because it can provide additional functions, such as driving in reverse and regenerative braking.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structure.

What is claimed is:

1. A hybrid vehicle comprising:

an engine;

a starter for starting said engine;

a motor/generator operated in both generator mode and motor mode in a reverse direction as well as in a forward direction;

a driving shaft connected with driving wheels through reduction gears; and a compound planetary-gear device having a first planetary-gear set connected to said motor/generator and a second planetary-gear set connected to said engine, wherein said first planetary-gear set has a first sun gear, a first annulus gear, and a plurality of first planetary gears mounted on a first carrier and said second planetary-gear set has a second sun gear, a second annulus gear, and a plurality of second planetary gears mounted on a second carrier, wherein said first sun gear is fixed to ground, said first carrier is interconnected with said second sun gear and said motor/generator, and said second carrier is connected to said engine.

2. The hybrid vehicle according to claim 1, wherein said hybrid vehicle further comprises:

a dual-drive clutch selectively to engage the connection between said fist annulus gear and said second annulus gear;

a dual-drive shaft connected with said first annulus gear device and said driving shaft through said dual-drive clutch, said second annulus gear being selectively connected to said dual-drive shaft and said first annulus gear device through said dual-drive clutch and connected to said driving shaft; and a locking clutch selectively to lock a shaft connected between said second carrier and said engine to ground.

3. The hybrid vehicle according to claim 2, wherein said locking clutch locked to ground when said motor/generator drives said driving wheels is in reverse direction and said engine is off.

4. The hybrid vehicle according to claim 1 further comprising a vehicle control device for powering said hybrid vehicle by said motor/generator alone when a vehicle speed detected by a vehicle speed detection device is below a predetermined switching vehicle speed, for starting said engine by said starter as well as turning off said motor/generator when said vehicle speed reaches said predetermined switching vehicle speed, and for modulating an output driving torque by controlling a torque and speed of said motor/generator.

5. The hybrid vehicle according to claim 2, wherein said dual-drive clutch is locked when said motor/generator is at a driving mode in forward direction and both said motor/generator and said engine can drive said hybrid vehicle through both said dual-drive shaft and said driving shaft.

6. The hybrid vehicle according to claim 2, wherein said dual-drive clutch is locked when said motor/generator is at a generator mode in forward direction and a generator load thereof is insufficient to release said dual-drive clutch from a locking condition.

7. The hybrid vehicle according to claim 2, wherein said dual-drive clutch is unlocked when said motor/generator is at a generator mode in forward direction and serves to generate electric power to recharge an energy storage device, said rotational speed of said engine is controlled by adjusting said rotational speed of said motor/generator through a differential action of said second planetary-gear set, and said hybrid vehicle is solely driven by said engine through said driving shaft.

8. The hybrid vehicle according to claim 1, wherein said second sun gear is connected to said driving wheels through said driving shaft and said reduction gears.

9. The hybrid vehicle according to claim 4, wherein said locking clutch is unlocked when said engine is started by said starter to serve as a main driving source of said hybrid vehicle, said motor/generator is off and said vehicle speed reaches said predetermined switching vehicle speed.

10. A power distributing device for use with a hybrid vehicle having an engine and a motor/generator comprising:
 a first planetary-gear set which has a first sun gear, a first annulus gear, and a plurality of first planetary gears mounted on a first carrier connected to said motor/generator, and
 a second planetary-gear set which has a second sun gear, a second annulus gear, and a plurality of second planetary gears mounted on a second carrier connected to said engine,
 wherein said first sun gear is fixed to ground, said first carrier is interconnected with said second sun gear and said motor/generator, and said second carrier is connected to said engine.

11. The power distributing device according to claim 10, wherein said power distributing device further comprises:
 a dual-drive clutch selectively to engage the connection between said first annulus gear and said second annulus gear;
 a dual-drive shaft connected with said first annulus gear device and said driving shaft through said dual-drive clutch, said second annulus gear being selectively connected to said dual-drive shaft and said first annulus gear device through said dual-drive clutch and connected to said driving shaft; and
 a locking clutch selectively to lock shaft connected between said carrier and said engine to ground.

12. The power distributing device according to claim 10, wherein said locking clutch is locked to ground when said motor/generator drives said driving wheels in reverse direction and said engine is off.

13. The power distributing device according to claim 10, wherein the rotational speed of said engine is controlled by adjusting the rotational speed of said motor/generator through a differential action of said second planetary-gear set.

14. The power distributing device according to claim 10, wherein said first and second planetary-gear sets connect said engine and said motor/generator to an output driving shaft to selectively drive said output drive at a selected speed, with each of said engine and said motor/generator independently driving said output driving shaft.

\* \* \* \* \*